(12) United States Patent
Shimizu et al.

(10) Patent No.: US 9,437,854 B2
(45) Date of Patent: Sep. 6, 2016

(54) BATTERY PACK

(71) Applicant: PANASONIC CORPORATION, Osaka (JP)

(72) Inventors: Keisuke Shimizu, Osaka (JP); Tomohiko Yokoyama, Osaka (JP); Masato Fujikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 179 days.

(21) Appl. No.: 14/357,543

(22) PCT Filed: Nov. 12, 2012

(86) PCT No.: PCT/JP2012/007230
§ 371 (c)(1),
(2) Date: May 9, 2014

(87) PCT Pub. No.: WO2013/069308
PCT Pub. Date: May 16, 2013

(65) Prior Publication Data
US 2014/0308550 A1  Oct. 16, 2014

(30) Foreign Application Priority Data
Nov. 11, 2011 (JP) .................................. 2011-247182

(51) Int. Cl.
*H01M 2/12* (2006.01)
*H01M 2/10* (2006.01)

(52) U.S. Cl.
CPC ......... *H01M 2/1223* (2013.01); *H01M 2/1077* (2013.01); *H01M 2/1241* (2013.01)

(58) Field of Classification Search
None
See application file for complete search history.

(56) References Cited

U.S. PATENT DOCUMENTS

2010/0009244 A1  1/2010  Murata
2010/0104928 A1  4/2010  Nishino et al.

FOREIGN PATENT DOCUMENTS

| JP | 06-333548 A | 12/1994 |
| JP | 2001-185113 A | 7/2001 |
| JP | 2002-008603 A | 1/2002 |
| JP | 2002-151025 A | 5/2002 |
| JP | 2003-297324 A | 10/2003 |
| JP | 2004-063254 A | 2/2004 |
| JP | 2004063254 * | 2/2004 |
| JP | 2006-099977 A | 4/2006 |
| JP | 2007-027011 A | 2/2007 |

(Continued)

OTHER PUBLICATIONS

International Search Report issued in International Application No. PCT/JP2012/007230 mailed Dec. 11, 2012, with English translation, 5 pgs.

*Primary Examiner* — Patrick Ryan
*Assistant Examiner* — Christopher Domone
(74) *Attorney, Agent, or Firm* — McDermott Will & Emery LLP

(57) ABSTRACT

A battery pack 200 including a plurality of cells 100, in which the plurality of cells 100 are arranged so as to be oriented in the same direction, the cells 100 each have a first safety valve and a second safety valve whose operating pressure is higher than an operating pressure of the first safety valve, the first safety valve of each cell 100 is connected to a first exhaust passage 50, the second safety valve of each cell 100 is connected to a second exhaust passage 60, and the first exhaust passage 50 is spatially separated from the second exhaust passage 60.

12 Claims, 8 Drawing Sheets

(56) References Cited

FOREIGN PATENT DOCUMENTS

| JP | 2007027011 | * | 2/2007 |
| JP | 2009-231131 A | | 10/2009 |
| JP | 2009-231207 A | | 10/2009 |
| JP | 2011-065906 A | | 3/2011 |
| JP | 2011-204577 A | | 10/2011 |
| JP | 2012-094507 A | | 5/2012 |

* cited by examiner

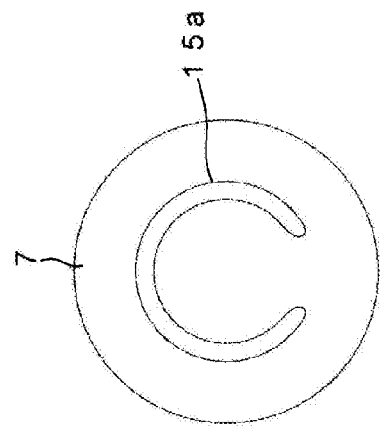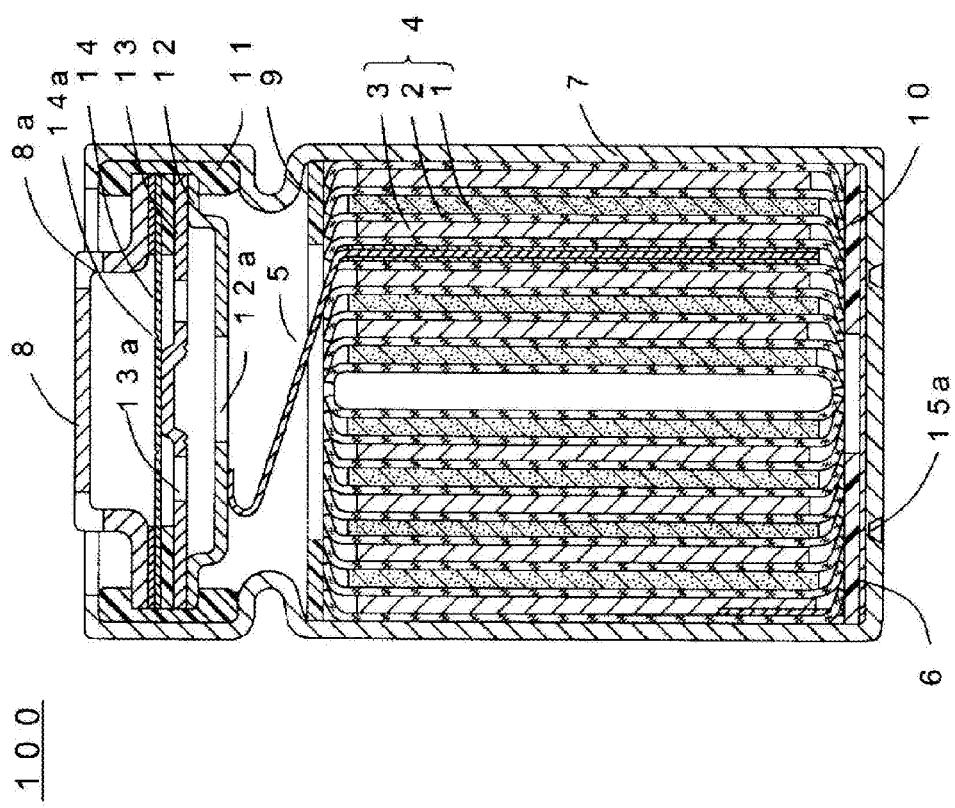

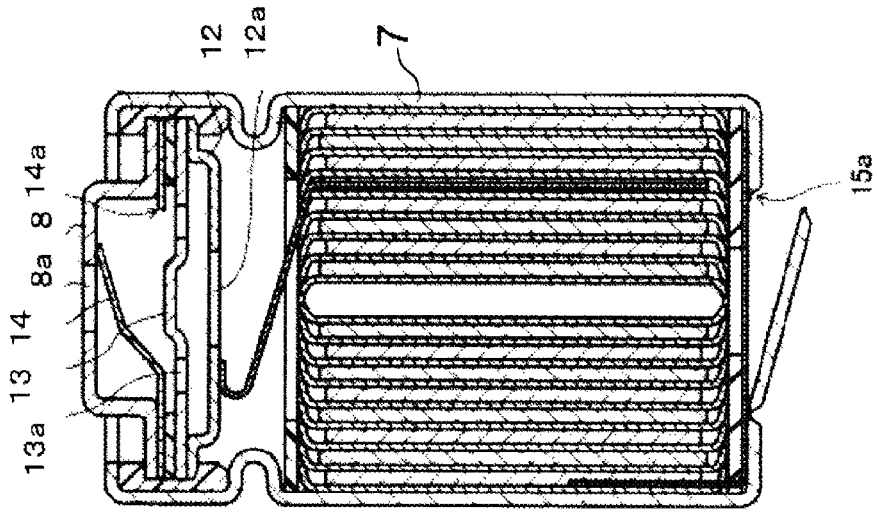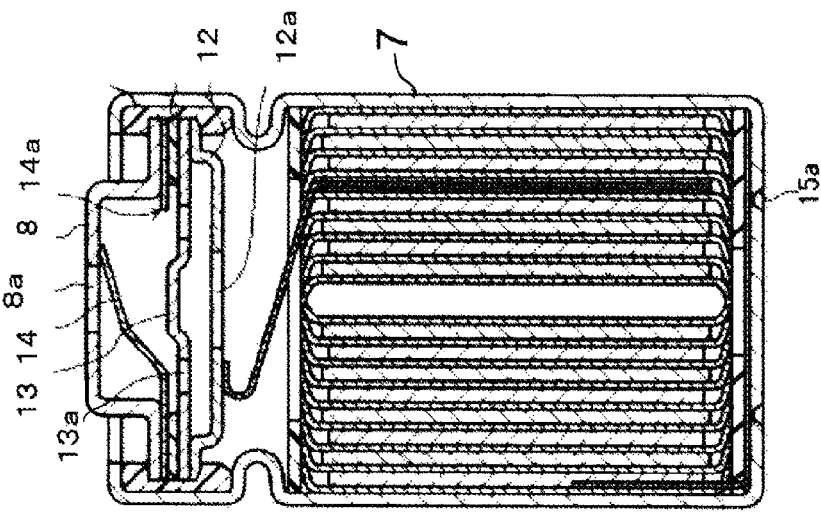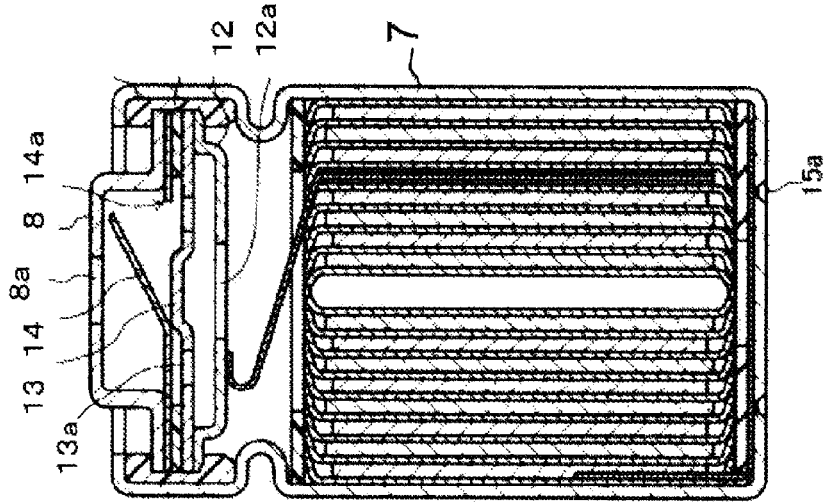

US 9,437,854 B2

BATTERY PACK

RELATED APPLICATIONS

This application is the U.S. National Phase under 35 U.S.C. §371 of International Application No. PCT/JP2012/007230, filed on Nov. 12, 2012, which in turn claims the benefit of Japanese Application No. 2011-247182, filed on Nov. 11, 2011, the disclosures of which are incorporated by reference herein.

TECHNICAL FIELD

The present disclosure relates to battery packs including a plurality of secondary batteries.

BACKGROUND ART

Battery packs each of which includes a plurality of batteries housed in a case so as to output a predetermined voltage and have a predetermined capacity are widely used as power sources for various equipment, vehicles, etc. For these batteries packs, there is a newly employed technique of connecting general-purpose batteries in parallel or in series to form modules of battery assemblies each outputting a predetermined voltage and having a predetermined capacity and of variously combining such battery modules to comply with various applications. This module technique enables reduction in size and weight of battery modules by enhancing performance of batteries housed in the battery modules, and therefore, has advantages such as improved workability in packaging battery packs and high flexibility in installing the battery modules in limited space of vehicles or other equipment.

On the other hand, along with enhancement of the performance of batteries housed in battery packs, higher importance is placed on, in addition to the safety of each battery, the safety of the battery packs each of which includes a plurality of batteries. In particular, when a gas is produced by heat generated by, e.g., an internal short-circuit occurring in a battery and a safety valve operates to release the gas having high temperature to the outside of the battery, normally operating batteries located near the battery suffering the internal short-circuit are exposed to and affected by the gas having high temperature, thereby causing a risk of a chain of degradation in the batteries.

To address such a problem, Patent Document 1 describes a power supply device in which a case housing a plurality of batteries is partitioned by a partitioning wall into a battery chamber housing the batteries, and an exhaust chamber through which a high-temperature gas released from the battery is exhausted, wherein the power supply device includes an exhaust mechanism in which an opening of a safety valve of each battery is in communication with the exhaust chamber. With the exhaust mechanism thus configured, the high-temperature gas released due to occurrence of a failure through the safety valve of the battery is allowed to flow into the exhaust chamber without flowing into the battery chamber, and is exhausted outside the case via an exhaust port of the case. This can prevent adjacent normal batteries from being subjected to the high-temperature gas released from the battery suffering the failure, so that the influences on the normal batteries can be reduced.

CITATION LIST

Patent Document

PATENT DOCUMENT 1: Japanese Unexamined Patent Publication No. 2007-27011

SUMMARY OF THE INVENTION

Technical Problem

The exhaust mechanism described in Patent Document 1 is advantageous in that the structure in which the exhaust chamber is separated from the battery chamber prevents the high-temperature gas having flowed from the opening of the battery into the exhaust chamber from coming into contact with the batteries, which can prevent deterioration of the normal batteries in a chain reaction.

Meanwhile, the safety valve operates due to several causes. For example, under normal use conditions, storage at a high temperature or repeated charge/discharge increases the pressure in a battery, which causes the safety valve to operate. In this case, the electrolyte and a flammable gas are released from the safety valve. When a failure such as an inner short-circuit occurs, at an initial stage, a gas having a relatively low temperature is slowly produced in the battery, which causes the safety valve to operate. In this case, the electrolyte and the flammable gas are released from the safety valve, and thereafter, a high-temperature gas is rapidly produced in the battery, and released from the safety valve.

However, according to Patent Document 1, all of the safety valves of the batteries communicate with the identical exhaust chamber. Consequently, when the safety valve of one battery in which a failure has occurred operates to release a high-temperature gas into the exhaust chamber, the electrolyte and a flammable gas having been released from the battery at the initial stage of the failure may remain in the exhaust chamber. Alternatively, the electrolyte and a flammable gas having been released from another battery whose safety valve has operated under normal use conditions may remain in the exhaust chamber.

In such cases, the high-temperature gas released from the safety valve of the battery suffering the failure may be mixed with the electrolyte and the flammable gas already present in the exhaust chamber and may cause a rapid reaction with the flammable gas and the like for example. This reaction may disadvantageously exert thermal influences on adjacent batteries, the apparatus equipped with the battery pack, etc.

It is therefore a principal object of the present disclosure to prevent an electrolyte, a flammable gas, and a high-temperature gas which have been released from at least one of cells provided in a battery pack from being mixed together in an exhaust passage, thereby to reduce thermal influences exerted on adjacent cells, apparatus equipped with the battery pack, and the like.

Solution to the Problem

To achieve the object, a battery pack of the present disclosure includes a plurality of cells, wherein the plurality of cells are arranged such that the cells are oriented in a same direction, the cells each have a first safety valve and a second safety valve whose operating pressure is higher than an operating pressure of the first safety valve, the first safety valve of each cell is connected to a first exhaust passage, the second safety valve of each cell is connected to a second exhaust passage, and the first exhaust passage is spatially separated from the second exhaust passage.

In the battery pack with this configuration, an increase in the pressure in at least one of the cells under normal use conditions or slow production of a gas at an initial stage of a failure causes the first safety valve whose operating pressure is low to operate. Consequently, the electrolyte and a flammable gas released from the first safety valve flow into the first exhaust passage connected to the first safety valves, and then exhausted outside the battery pack. On the other hand, rapid production of a high-temperature gas due to occurrence of the failure causes the second safety valve whose operating pressure is high to operate. Consequently, the high-temperature gas released from the second safety valve flows into the second exhaust passage connected to the second safety valves, and then exhausted outside the battery pack. Thus, the battery pack of the present disclosure has the configuration in which each of the cells has two safety valves that are configured to operate at different operating pressures in accordance with the states of the gas and the like which can be released from the cells and in which the two safety valves are respectively connected to the two exhaust passages spatially separated from each other. This configuration makes it possible to exhaust the high-temperature gas, the electrolyte and the flammable gas that have been released from the cell in a separate manner. Consequently, it is possible to prevent mixing of the high-temperature gas released into the exhaust passage with the electrolyte and the flammable gas in the exhaust passage, and the thermal influences on adjacent cells and the apparatus equipped with the battery pack can be reduced.

Advantages of the Invention

According to the present disclosure, in a battery pack including a plurality of cells, it is possible to prevent mixing of a high-temperature gas released into an exhaust passage due to occurrence of a failure with an electrolyte and a flammable gas in the exhaust passage. Consequently, thermal influences on adjacent cells and apparatus equipped with the battery pack can be reduced.

BRIEF DESCRIPTION OF THE DRAWINGS

FIG. 1A is a cross-sectional view illustrating a configuration of a cell to be used in a battery pack according to an embodiment of the present disclosure. FIG. 1B is a bottom view of the cell to be used in the battery pack according to the embodiment.

FIGS. 5A-5C are cross-sectional views illustrating operation by safety valves of a cell according to another embodiment of the present disclosure.

DESCRIPTION OF EMBODIMENTS

Figure 2:
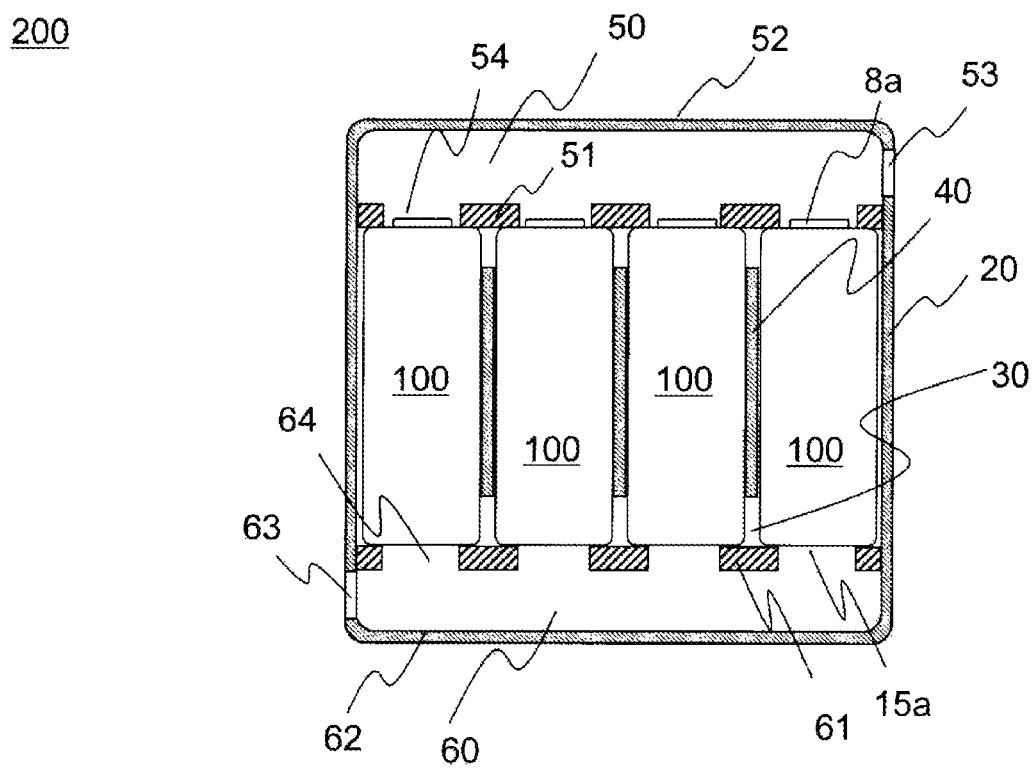
FIG. 2 is a cross-sectional view illustrating a configuration of a battery pack according to the embodiment of the present disclosure.

A battery pack of the present disclosure includes a plurality of cells, wherein the plurality of cells are arranged such that the cells are oriented in the same direction, the cells each have a first safety valve and a second safety valve whose operating pressure is higher than an operating pressure of the first safety valve, the first safety valve of each cell is connected to a first exhaust passage, the second safety valve of each cell is connected to a second exhaust passage, and the first exhaust passage is spatially separated from the second exhaust passage.

This configuration in which each of the cells has two safety valves configured to operate at different operating pressures in accordance with the states of the gas and the like that can be released from the cells and in which the two safety valves are respectively connected to the two exhaust passages spatially separated from each other makes it possible to prevent mixing of the high-temperature gas released into the exhaust passages with the electrolyte and the flammable gas in the exhaust passage, and the thermal influences on adjacent cells and the apparatus equipped with the battery pack can be reduced.

In the present invention, an amount of a gas released per unit time from each first safety valve in operation is preferably smaller than an amount of a gas released per unit time from each second safety valve in operation.

With this configuration, when an increase in the pressure of the high-temperature gas produced in at least one of the cells causes the corresponding second safety valve to operate, nearly all of the high-temperature gas is released into the second exhaust passage almost without flowing into the first exhaust passage. If the first exhaust passage should receive a small amount of the high-temperature gas, of which the thermal capacity is very small, the heat of the high-temperature gas is absorbed by the materials forming the first exhaust passage and air present in the first exhaust passage, and the high-temperature gas cannot maintain a temperature which can cause a rapid reaction with the electrolyte and the flammable gas. As a result, even if the high-temperature gas should be released into the first exhaust passage, it is possible to prevent the high-temperature gas from rapidly reacting with the electrolyte and the flammable gas present in the first exhaust passage.

It is preferable that an opening area of each first safety valve in operation is smaller than an opening area of each second safety valve in operation. Thus, the configuration in which the amount of the gas released per unit time from each first safety valve in operation is smaller than the amount of the gas released per unit time from each second safety valve in operation can be easily achieved.

Here, the opening area of each first safety valve in operation is preferably smaller than or equal to one-tenth, and more preferably, smaller than or equal to one-twentieth the opening area of each second safety valve in operation. This configuration makes it possible to prevent nearly all of the high-temperature gas produced in the cell from being released into the first exhaust passage when the second safety valve operates due to an increase in the pressure of the high-temperature gas.

It is preferable that each first safety valve is configured to become blocked at least when the corresponding second safety valve operates. This configuration can surely prevent the high-temperature gas produced in the cell from being released into the first exhaust passage when the second safety valve operates due to an increase in the pressure of the high-temperature gas. Consequently, it is possible to surely prevent mixing of the high-temperature gas with the electrolyte and the flammable gas in the first exhaust passage, and a rapid reaction which can be caused by the mixing.

According to a preferable embodiment, the plurality of cells are housed in a case, the first safety valves are provided at ends of the cells such that the first safety valves are located at one side, the second safety valves are provided at the other ends of the cells such that second safety valves are located opposite to the first safety valves, and a first partitioning wall provided on the ends of the cells and a second partition wall provided on the other ends of the cells partition the case into the first exhaust passage, a housing configured to house the cells, and the second exhaust passage.

It is preferable that at least one of a gas absorber, a fire-extinguishing agent, or a coolant is provided in the first exhaust passage or the second exhaust passage. With this configuration, when the first safety valve operates, the gas absorber quickly absorbs the electrolyte and a flammable gas released into the first exhaust passage, and accordingly, the electrolyte and the flammable gas remaining in the first exhaust passage can be considerably reduced in amount. Consequently, even if part of a high-temperature gas is released into the first exhaust passage when the second safety valve operates, it is possible to prevent the high-temperature gas from rapidly reacting with the electrolyte and the flammable gas. In case of occurrence of a rapid reaction of the high-temperature gas with the electrolyte and the flammable gas, the fire-extinguishing agent can quickly stop the reaction and reduce thermal influences on adjacent cells and apparatus equipped with the battery pack.

It is preferable that at least one of a temperature sensor or a gas sensor is provided in the first exhaust passage or the second exhaust passage. With this configuration, the sensor provided in the first or second exhaust passage can detect occurrence of a failure in the battery pack when the electrolyte and the flammable gas flow into the first exhaust passage or when the high-temperature gas flows into the second exhaust passage. Consequently, it is possible to quickly take a measure to ensure safety of the apparatus equipped with the battery pack when a failure occurs in the battery pack.

It is preferable that at least part of the second exhaust passage is made of a heat-resistant material or a flame-retarding material. When a high-temperature gas flows into the second exhaust passage, this configuration can prevent the second exhaust passage from suffering deformation or damage which can be caused by the heat of the high-temperature gas and which can allow the high-temperature gas to flow into the housing that houses the cells or into the first exhaust passage via the housing. Consequently, it is possible to prevent exposure of the cells in the housing to the high-temperature gas, and mixing of the electrolyte and the flammable gas present in the first exhaust passage with the high-temperature gas.

It is preferable that airtightness of the second exhaust passage is higher than that of the first exhaust passage. When a high-temperature gas flows into the second exhaust passage, this configuration can prevent the high-temperature gas from flowing into the housing that houses the cells or into the first exhaust passage via the housing. Consequently, it is possible to prevent exposure of the cells in the housing to the high-temperature gas, and mixing of the electrolyte and the flammable gas present in the first exhaust passage with the high-temperature gas.

It is preferable that the first exhaust passage has a first exhaust port through which a gas released from at least one of the first safety valves is exhausted to the outside, the second exhaust passage has a second exhaust port through which a gas released from at least one of the second safety valves is exhausted to the outside, and a pressure loss of the gas passing through the second exhaust passage is smaller than a pressure loss of the gas passing through the first exhaust passage. When a high-temperature gas flows into the second exhaust passage, this configuration controls an increase in the pressure of the second exhaust passage, and can prevent the second exhaust passage from suffering deformation or damage which can allow the high-temperature gas to flow into the housing that houses the cells or into the first exhaust passage via the housing. Consequently, it is possible to prevent exposure of the cells in the housing to the high-temperature gas, and mixing of the electrolyte and the flammable gas present in the first exhaust passage with the high-temperature gas.

Embodiments of the present disclosure will be described below in detail with reference to the drawings. Note that the present disclosure is not limited to the following embodiments. Various changes and modifications may be made without departing from the scope of the present disclosure. The following embodiments may be combined with other embodiments.

<Cell>

FIGS. 1A and 1B illustrate a configuration of each of cells 100 to be used in a battery pack according to an embodiment of the present disclosure (hereinafter, each of the batteries to be used in the battery pack is referred to as the "cell").

For example, a cylindrical lithium ion secondary battery as illustrated in FIG. 1A may be adopted as the cell 100 to be used in the battery pack of the present disclosure. In general, a lithium ion secondary battery is equipped with a safety mechanism which is configured to release a gas to the outside of the battery when the pressure in the battery increases due to occurrence of an internal short-circuit and the like. The configuration of the cell 100 is specifically described with reference to FIGS. 1A and 1B.

As illustrated in FIG. 1A, an electrode group 4 formed by winding a positive electrode 1 and a negative electrode 2 with a separator 3 interposed between the electrodes 1 and 2 is housed in a cell case 7 together with a nonaqueous electrolyte (not shown). Insulating plates 9 and 10 are disposed above and under the electrode group 4, respectively. The positive electrode 1 is joined to a filter 12 via a positive electrode lead 5, and the negative electrode 2 is joined to a bottom of the cell case 7 via a negative electrode lead 6. The bottom of the cell case 7 also serves as a negative electrode terminal.

The filter 12 is connected to an inner cap 13, and a projection of the inner cap 13 is joined to a gas release valve 14 made of a metal. Moreover, the gas release valve 14 is connected to a terminal plate 8 which also serves as a positive electrode terminal. The terminal plate 8, the gas release valve 14, the inner cap 13, and the filter 12 together seal an opening of the cell case 7 via a gasket 11.

In the gas release valve 14, a thin wall portion 14a which is configured to rupture when the pressure in the cell reaches a predetermined value is formed. In order to release a gas produced in the cell to the outside when the gas release valve 14 ruptures, the filter 12 has a filter hole 12a, the inner cap 13 has an opening 13a, and the terminal plate 8 has a gas release vent 8a. The gas release valve 14, the filter 12, the inner cap 13, and the terminal plate 8 together form a first safety valve. Accordingly, the operating pressure of the first safety valve corresponds to the rupture pressure at which the thin wall portion 14a ruptures. The opening area of the first safety valve is determined depending on the smallest area among the areas of the filter hole 12a, the opening 13a, the gas release vent 8a, and the opening to be formed by rupture of the thin wall portion 14a.

Moreover, as illustrated in FIG. 1B, an engraved thin wall portion 15a which is configured to rupture when the pressure in the cell reaches a predetermined value is formed on the bottom of the cell case 7. The engraved thin wall portion 15a on the bottom of the cell case 7 forms a second safety valve.

The engraved thin wall portion 15a on the bottom of the cell case 7 is configured to rupture at a rupture pressure which is higher than the rupture pressure of the thin wall portion 14a of the gas release valve 14. That is, the operating pressure of the second safety valve is higher than that of the first safety valve. The area of an opening to be formed when the engraved thin wall portion 15a on the bottom of the cell case 7 ruptures corresponds to the opening area of the second safety valve.

When the pressure in the cell 100 increases, the gas release valve 14 bulges toward the terminal plate 8, and the inner cap 13 is disconnected from the gas release valve 14, resulting in an interruption of a current path. When the pressure in the cell 100 further increases, the gas release valve 14 ruptures. Consequently, the gas produced in the cell 100 is released to the outside through the filter hole 12a of the filter 12, the opening 13a of the inner cap 13, the rupture portion of the thin wall portion 14a of the gas release valve 14, and the gas release vent 8a of the terminal plate 8.

In the present disclosure, the term of "safety valve" refers to mechanisms having a function of releasing a gas produced in each cell when the pressure in the cell increases, and is not necessarily limited to the structures illustrated in FIGS. 1A and 1B. For example, the cell of the present disclosure may be equipped with a safety valve configured as follows. The cell may be sealed with a gasket or packing configured to cleave at a particular pressure. Alternatively, the cell may be sealed with an elastic member such as a resin member or a spring which is pressed onto the opening of the cell and configured to release a gas through a gap to be created by deformation of the elastic member caused by an increase in the pressure in the cell.

<Battery Pack>

FIG. 2 schematically illustrates a configuration of a battery pack 200 according to the embodiment of the present disclosure.

The battery pack 200 includes a plurality of the cells 100 housed in a pack case 20. The cells 100 are arranged so as to be oriented in the same direction and are each secured to a predetermined position by corresponding ones of spacers 40 formed in a housing 30. As illustrated in FIGS. 1A and 1B, in order to release a gas produced in the cell 100 outside the cell 100, each cell 100 has the gas release vent 8a serving as the releasing portion of the first safety valve and the engraved thin wall portion 15a serving as the releasing portion of the second safety valve.

The pack case 20 includes a first partitioning wall 51 provided close to ends of the cells 100 located at one side (in this embodiment, close to the terminal plates 8) and a second partitioning wall 61 provided close to the other ends of the cells 100 (in this embodiment, close to the engraved thin wall portions 15a). The first and second partitioning walls 51 and 61 partition the pack case 20 into the housing 30 configured to house the plurality of cells 100, a first exhaust passage 50 through which a gas released from the gas release vent 8a of at least one of the cells 100 passes to be exhausted through a first exhaust port 53 to the outside of the pack case 20, and a second exhaust passage 60 through which a gas released from the engraved thin wall portion 15a of at least one of the cells 100 passes to be exhausted through a second exhaust port 63 to the outside of the pack case 20. Thus, the first exhaust passage 50 and the second exhaust passage 60 are spatially separated from each other. Further, the first exhaust port 53 and the second exhaust port 63 are formed in different sides of the pack case 20 such that the gas released from one exhaust port is unlikely to be mixed with the gas released from the other exhaust port.

The gas release vent 8a of each cell 100 communicates with the first exhaust passage 50 via a corresponding one of first connection passages 54 formed in the first partitioning wall 51, and the first exhaust passage 50 is located between the first partitioning wall 51 and a first outer plate 52 serving as the upper lid of the pack case 20. In a similar manner, the engraved thin wall portion 15a of each cell 100 communicates with the second exhaust passage 60 via a corresponding one of second connection passages 64 formed in the second partitioning wall 61, and the second exhaust passage 60 is located between the second partitioning wall 61 and a second outer plate 62 serving as the lower lid of the pack case 20.

The first partitioning wall 51 and the second partitioning wall 61 are in intimate contact with the corresponding end portions of each cell 100 (in this embodiment, the end portion near the terminal plate 8, and the end portion of the bottom of the cell case 7, respectively). Consequently, the housing 30 is hermetically sealed with the first partitioning wall 51 and the second partitioning wall 61, and the gas released from the gas release vents 8a of at least one of the cells 100 and the gas released from the engraved thin wall portions 15a of at least one of the cells 100 are not allowed to flow into the housing 30.

With this configuration, when the inner pressure increases in at least one of the cells 100 of the battery pack 200 under normal use conditions (inclusive of long term storage at high temperature and long term charge/discharge), the corresponding thin wall portion 14a formed in the gas release valve 14 and having the rupture pressure lower than that of the engraved thin wall portion 15a on the bottom of the cell case 7 is caused to preferentially rupture. Consequently, the electrolyte and a flammable gas present in the cell are released from the gas release vent 8a serving as the releasing portion of the first safety valve into the first exhaust passage 50 via the corresponding first connection passage 54 formed in the first partitioning wall 51.

In a similar manner, when a gas is slowly produced at an initial stage of a failure such as an inner short-circuit and overcharge, the electrolyte and the flammable gas in the cell are released from the gas release vent 8a into the first exhaust passage 50. Further, when the gas is rapidly produced due to occurrence of the failure, the pressure in the cell 100 also increases rapidly and the engraved thin wall portion 15a formed on the bottom of the cell case 7 and having the higher rupture pressure is also caused to rupture. Consequently, the high-temperature gas is released from the engraved thin wall portion 15a serving as the releasing portion of the second safety valve into the second exhaust passage 60 via the corresponding second connection passage 64 formed in the second partitioning wall 61.

Thus, when a failure occurs in any of the cells 100 housed in the battery pack 200 and the high-temperature gas is released, the high-temperature gas passes through the second exhaust passage 60 to be exhausted through the second exhaust port 63 to the outside of the battery pack 200. At this time, the electrolyte and the flammable gas released from the cell 100 suffering the failure or from other adjacent cells prior to the production of the high-temperature gas have already passed through the first exhaust passage 50 to be exhausted through the first exhaust port 53 to the outside of the battery pack 200. Accordingly, it is possible to prevent the high-temperature gas, the electrolyte, and the flammable gas from being mixed together in the pack case 200 and from causing a rapid reaction which can exert thermal influences on adjacent cells and the apparatus equipped with the battery pack.

As described above, the battery pack 200 of the present disclosure includes the plurality of the cells (secondary batteries) 100 that are arranged so as to be oriented in the same direction, and the cells 100 each have the first safety valve and the second safety valve whose operating pressure is higher than that of the first safety valve. The first safety valve of each cell 100 is connected to the first exhaust passage 50, the second safety valve of each cell 100 is connected to the second exhaust passage 60, and the first and second exhaust passages 50 and 60 are spatially separated from each other.

Thus, the configuration, in which each of the cells 100 is provided with two safety valves configured to operate at different operating pressures in accordance with the states of the gas and the like that can be released from the cells 100 and the two safety valves are respectively connected to the first and second exhaust passages 50 and 60 spatially separated from each other, can prevent mixing of the high-temperature gas released into the second exhaust passage 60 with the electrolyte and the flammable gas in the first exhaust passage 50. Consequently, thermal influences on the adjacent cells and the apparatus equipped with the battery pack can be reduced.

In the present invention, an amount of a gas released per unit time from the first safety valve in operation is preferably smaller than an amount of a gas released per unit time from the second safety valve in operation.

With this configuration, when an increase in the pressure of a high-temperature gas produced in at least one of the cells 100 causes the corresponding second safety valve to operate, nearly all of the high-temperature gas is released into the second exhaust passage 60 almost without flowing into the first exhaust passage 50. If the first exhaust passage 50 should receive a small amount of the high-temperature gas, which has a very small thermal capacity, the heat of the high-temperature gas is absorbed by the materials forming the first exhaust passage 50, air and the like present in the first exhaust passage 50. Accordingly, the high-temperature gas cannot maintain a temperature which can cause a rapid reaction with the electrolyte and the flammable gas. As a result, even if the high-temperature gas should be released into the first exhaust passage 50, it is possible to prevent a rapid reaction which can be caused by mixing of the high-temperature gas with the electrolyte and the flammable gas present in the first exhaust passage 50.

Configurations of cells and battery packs according to other embodiments of the present disclosure will be described below with reference to the drawings.

Figure 3:
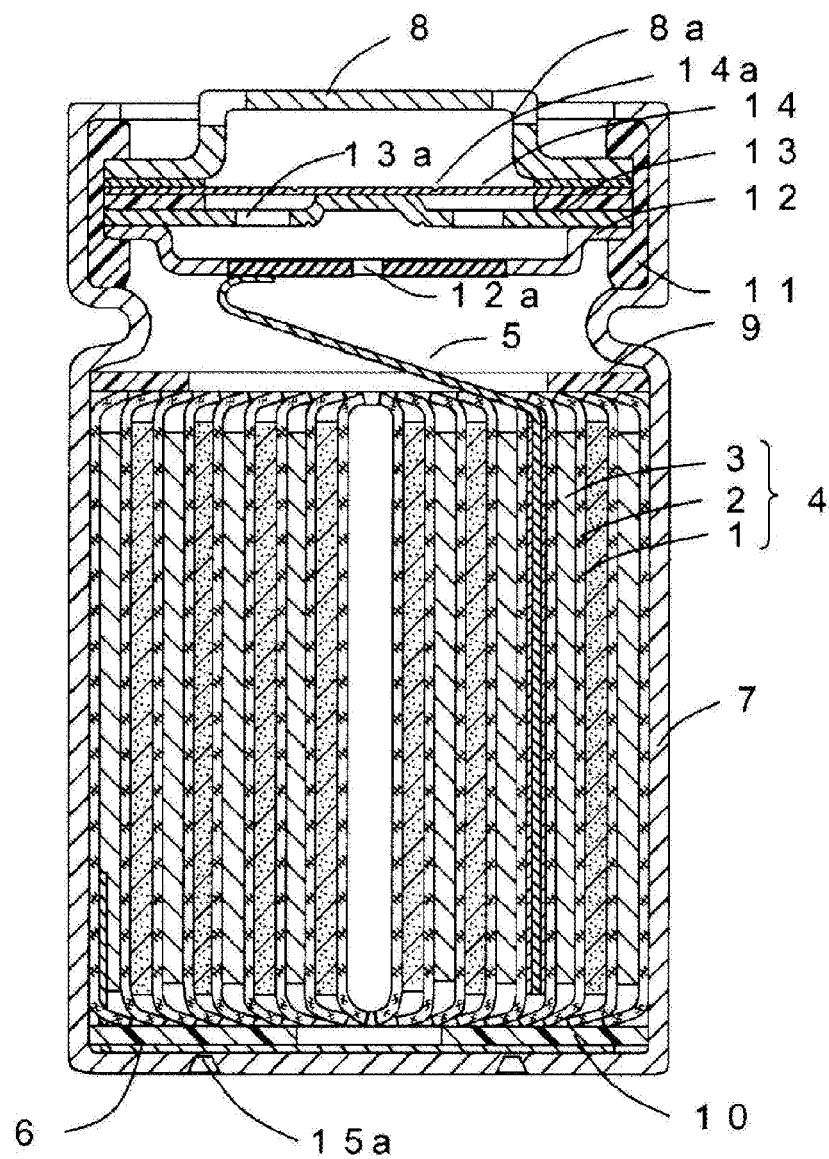
FIG. 3 is a cross-sectional view illustrating a configuration of a cell according to another embodiment of the present disclosure.

FIG. 3 is a cross-sectional view illustrating a configuration of a cell 102 according to one of the embodiments of the present disclosure. As illustrated in FIG. 3, in the cell 102, the filter hole 12a of the filter 12 is smaller than the opening area of the second safety valve formed by rupture of the engraved thin wall portion 15a of the cell case 7. As described above, the opening area of the first safety valve is determined depending on (corresponds to?) the smallest area among the areas of the filter hole 12a, the opening 13a, the gas release vent 8a, and the opening to be formed by rupture of the thin wall portion 14a, through which the gas produced in the cell is released. Accordingly, in the cell of this embodiment, the opening area of the filter hole 12a corresponds to the opening area of the first safety valve.

Here, it is known that, when a high-temperature gas is produced in the cell, the amount of the high-temperature gas released per unit time from the first safety valve or the second safety valve is substantially proportional to the opening area of the corresponding safety valve. Accordingly, as the opening area of the first safety valve becomes smaller relative to the opening area of the second safety valve, the amount of the high-temperature gas released from the first safety valve into the first exhaust passage 50 is reduced.

The inventors of the present disclosure conducted intensive studies to find the following: With use of cells in each of which the opening area of the first safety valve is smaller than or equal to one-tenth, and more preferably smaller than or equal to one-twentieth the opening area of the second safety valve, even if a high-temperature gas produced in the cell is released into the first exhaust passage 50, no rapid reactions can be caused by mixing of the high-temperature gas with the electrolyte and the flammable gas present in the first exhaust passage 50.

This is presumed to be because the configuration in which the opening area of the first safety valve is designed to be sufficiently smaller relative to that of the second safety valve results in that the heat of the high-temperature gas released into the first exhaust passage 50 is absorbed by the air and gas present in the first exhaust passage 50 and the materials forming the first exhaust passage 50, and consequently, the high-temperature gas released into the first exhaust passage 50 cannot maintain a temperature which causes a rapid reaction with the electrolyte and the flammable gas.

Accordingly, the battery pack 200 housing the cells 102 in each of which the opening area of the first safety valve is smaller than the opening area of the second safety valve (the former is preferably one-tenth or less, and more preferably one-twentieth or less of the latter) is advantageous in that: In a state where the electrolyte and a flammable gas are released, for some cause, into the first exhaust passage 50 from the first safety valve of at least one of the cells 102, and thereafter, a high-temperature gas is released into the second exhaust passage 60 from the corresponding second safety valve, even if the high-temperature gas produced in the at least one cell 102 is allowed to flow into the first exhaust passage 50 through the gas release vent 8a serving as the releasing portion of the first safety valve, since the opening area of the first safety valve (in this embodiment, the opening area of the filter hole 12a) is sufficiently smaller relative to the opening area of the second safety valve (in this embodiment, the opening area formed by rupture of the engraved thin wall portion 15a of the cell case 7), most of the high-temperature gas flows into the second exhaust passage 60 through the engraved thin wall portion 15*a* serving as the releasing portion of the second safety valve, and a small amount of the high-temperature gas allowed to flow into the first exhaust passage 50 is cooled in the passage 50. Consequently, it is possible to prevent a rapid reaction which can be caused by mixing of the electrolyte, the flammable gas, and the high-temperature gas that have flowed into the first exhaust passage 50 and which can exert thermal influences on adjacent cells and the apparatus equipped with the battery pack.

Figure 4:
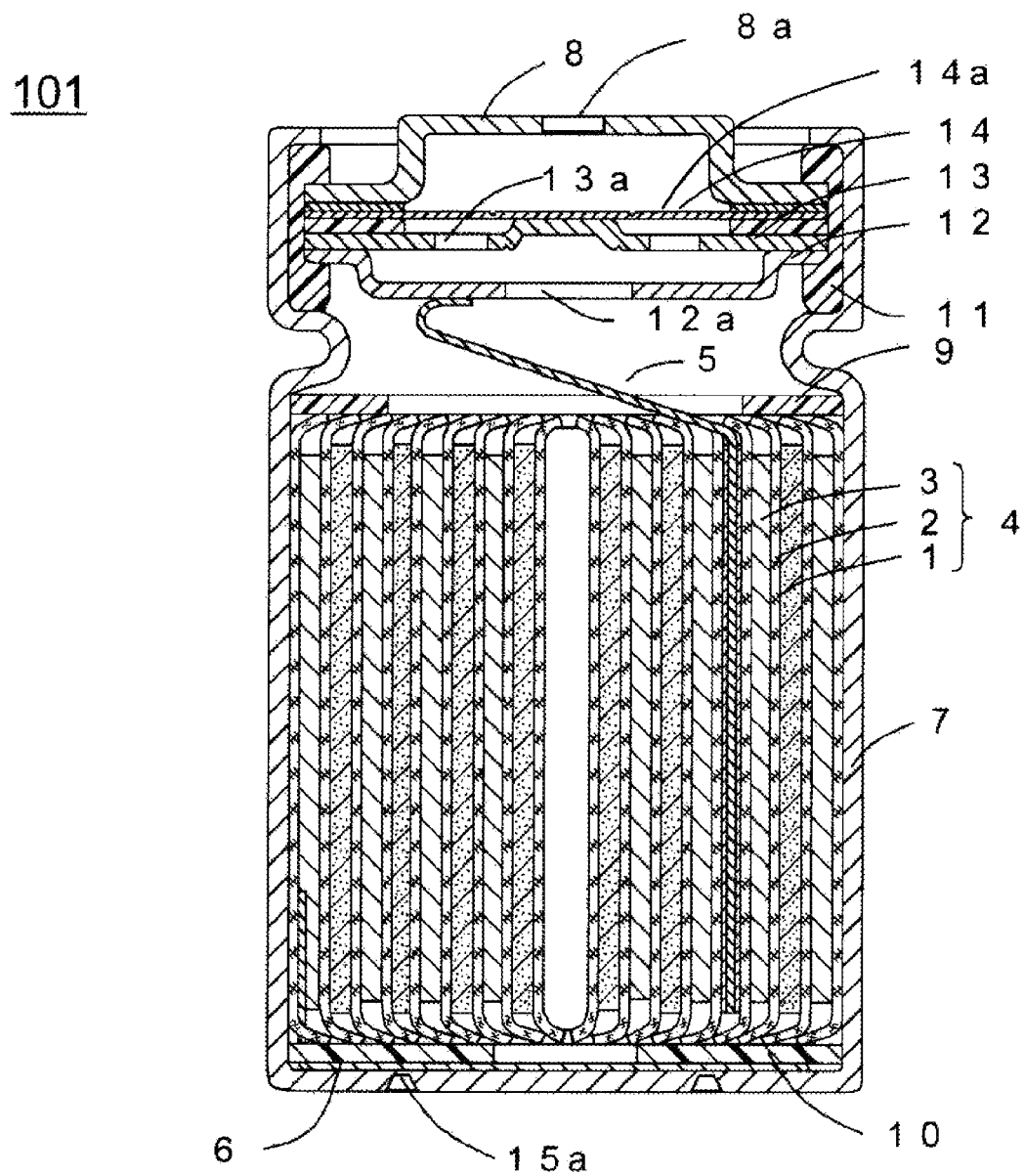
FIG. 4 is a cross-sectional view illustrating a configuration of a cell according to another embodiment of the present disclosure.

FIG. 4 is a cross-sectional view illustrating a configuration of a cell 101 according to one of the embodiments of the present disclosure. As illustrated in FIG. 4, in the cell 101, the gas release vent 8*a* serving as the releasing portion of the first safety valve is located in a central part of the terminal plate 8. The first safety valve having this configuration becomes blocked when the second safety valve operates.

With reference to FIGS. 5A-5C, operation by the safety valves of the cell 101 of this embodiment is now described.

FIG. 5A illustrates a state in which the first safety valve operates at an initial stage of gas production. Specifically, the temperature of the cell gradually increases because of overcharge for example, and the electrolyte evaporates or decomposes in the hermetically sealed cell case 7. When the pressure in the cell exceeds the rupture pressure of the thin wall portion 14*a* of the gas release valve 14 (i.e., the operating pressure of the first safety valve), the thin wall portion 14*a* ruptures. Consequently, the pressure in the cell is released outside the cell via the filter hole 12*a* of the filter 12, the opening 13*a* of the inner cap 13, the rupture portion of the thin wall portion 14*a* of the gas release valve 14, and the gas release vent 8*a* of the terminal plate 8. At this stage, the gas having a relatively low temperature is slowly produced. The rupture of the thin wall portion 14*a* of the gas release valve 14 allows the electrolyte and the flammable gas to be released outside of the cell via the gas release vent 8*a* of the terminal plate 8.

FIG. 5B illustrates a state in which the temperature of the cell has increased further, a rapid chemical reaction occurs to produce a high-temperature gas rapidly in the cell, and the first safety valve is blocked. Specifically, at this stage, part of the gas release valve 14 that has ruptured is deformed by a pressure increase caused by a large amount of the spouting high-temperature gas and pushed up toward the terminal plate 8, and thereby produce blockage of the gas release vent 8*a*. To cause the blockage of the gas release vent 8*a* by means of the gas release valve 14 that has ruptured, an end of rupture part of the gas release valve 14 needs to come into contact with the terminal plate 8. It is accordingly sufficient to determine, as appropriate, the distance between the terminal plate 8 and the gas release valve 14 and the position of the thin wall portion 14*a* on the gas release valve 14 with taking the size of the gas release vent 8*a* into account.

FIG. 5C illustrates a state in which the first safety valve remains blocked, the pressure in the cell has further increased, and the second safety valve has operated. Specifically, since the gas is not allowed to be released from the first safety valve, the pressure in the cell rapidly increases. When the pressure in the cell exceeds the rupture pressure of the engraved thin wall portion 15*a* of the cell case 7 (i.e., the operating pressure of the second safety valve), the engraved thin wall portion 15*a* ruptures, and consequently, the high-temperature gas produced in the cell is released outside the cell through the rupture part of the engraved thin wall portion 15*a* of the cell case 7.

The battery pack 200 housing the cells 101 each of which is configured so that the first safety valve becomes blocked when the second safety valve operates has the following advantage: In a state where the electrolyte and a flammable gas are released, for some cause, into the first exhaust passage 50 through the first safety valve of at least one of the cells 101, and thereafter, a high-temperature gas is released into the second exhaust passage 60 through the corresponding second safety valve, when the high-temperature gas is being released through the second safety valve, the first safety valve has become blocked. Accordingly, it is possible to prevent the high-temperature gas produced in the cell 101 from flowing into the first exhaust passage. It is thus possible to surely prevent the electrolyte and the flammable gas present in the first exhaust passage 50 from being mixed with the high-temperature gas.

In the present disclosure, the "blockage" of the first safety valve does not necessarily mean complete blockage, but refers to a state in which the opening area of the first safety valve is reduced to the extent that the first safety valve can prevent the high-temperature gas produced in the cell after the second safety valve has operated from being released through the first safety valve.

Figure 6:
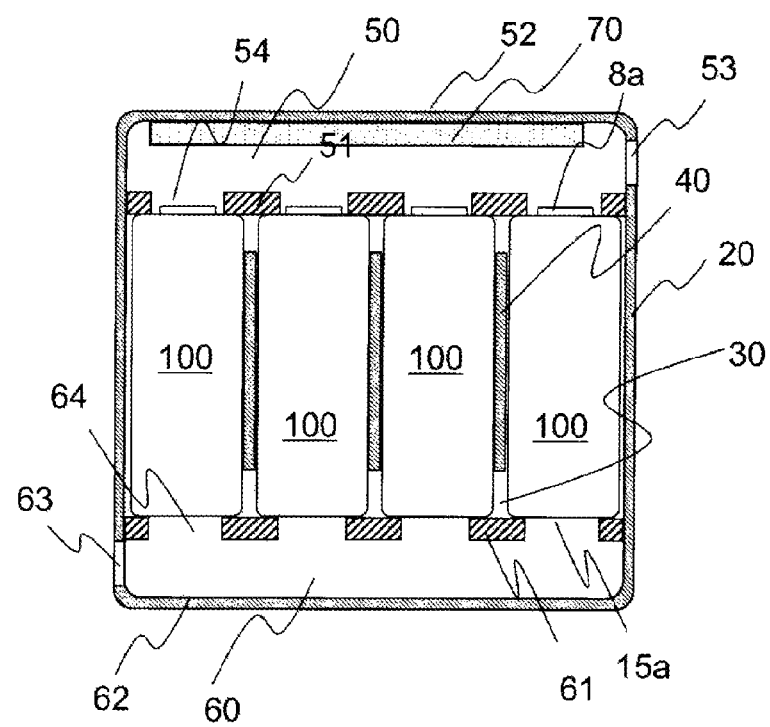
FIG. 6 is a cross-sectional view illustrating a configuration of a battery pack according to another embodiment of the present disclosure.

FIG. 6 is a cross-sectional view illustrating a configuration of a battery pack 201 according to one of the embodiments of the present disclosure. As illustrated in FIG. 6, the battery pack 201 includes a gas absorber 70 provided in the first exhaust passage 50. In the battery pack 201 with this configuration, when the electrolyte and a flammable gas flow into the first exhaust passage 50, they are absorbed by the gas absorber 70. Accordingly, it is possible to surely prevent the electrolyte and the flammable gas from flowing out of the first exhaust passage 50 to be mixed with high-temperature gas which can be produced due to occurrence of a failure. In addition, this configuration in which the gas absorber 70 absorbs the electrolyte and the flammable gas can prevent the electrolyte and the flammable gas from entering the housing 30 through gaps in the partitioning wall 51 and from coming into contact with the cells 100 to cause corrosion on the cell cases 7.

Although this embodiment exemplifies the specific configuration in which the gas absorber 70 is provided in the first exhaust passage 50, the present disclosure is not limited to this configuration. For example, a configuration in which a fire-extinguishing agent is provided in the first exhaust passage 50 may also be adopted into the present disclosure. If this is the case, even when a high-temperature gas flows into the first exhaust passage 50 for some cause, and a rapid reaction is caused by mixing of the high-temperature gas with the electrolyte and the flammable gas, the fire-extinguishing agent provided in the first exhaust passage 50 can reduce thermal influences on adjacent cells and the apparatus equipped with the battery pack.

A configuration in which a coolant is provided in the first exhaust passage 50 may also be adopted into the present disclosure. If this is the case, even when a high-temperature gas flows into the first exhaust passage 50 for some cause, the coolant provided in the first exhaust passage 50 cools the high-temperature gas within the passage. In this manner, it is possible to prevent a rapid reaction which can be caused by mixing of the electrolyte, the flammable gas, and the high-temperature gas that have flowed into the first exhaust passage 50, and which can exert thermal influences on adjacent cells and the apparatus equipped with the battery pack.

Moreover, a configuration in which a gas absorber, a fire-extinguishing agent, or a coolant is provided in the second exhaust passage 60 may also be adopted into the present disclosure. If this is the case, even when the electrolyte and a flammable gas flow into the seconds exhaust passage 60 for some cause, it is possible to prevent a rapid reaction which can be caused by mixing of the electrolyte, the flammable gas, and a high-temperature gas, and which can exert thermal influences on adjacent cells and the apparatus equipped with the battery pack, in a manner similar to the configurations in which the gas absorber, the fire-extinguishing agent, or the coolant is provided in the first exhaust passage 50.

Figure 7:
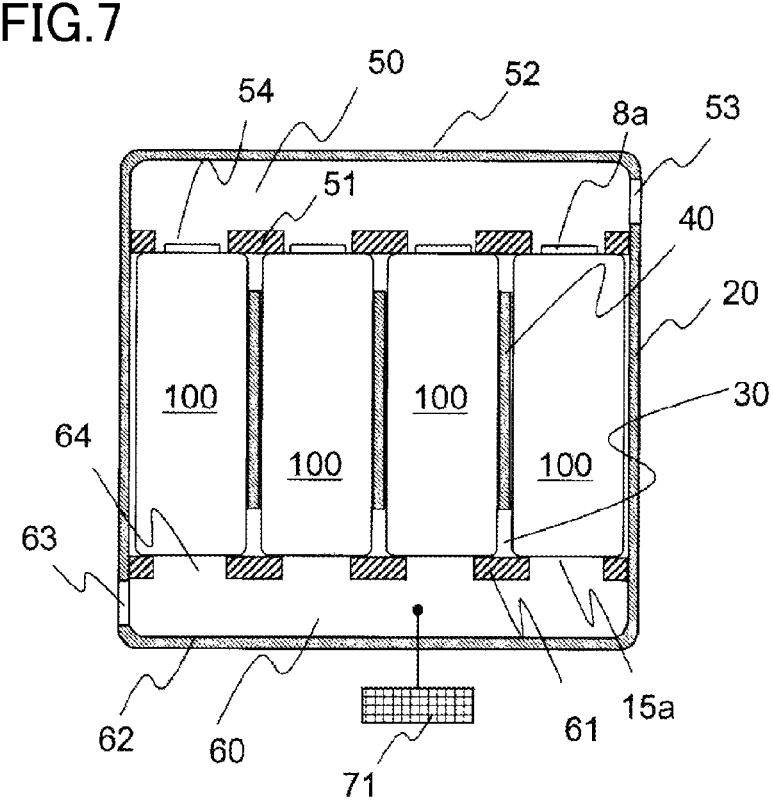
FIG. 7 is a cross-sectional view illustrating a configuration of a battery pack according to another embodiment of the present disclosure.

FIG. 7 is a cross-sectional view illustrating a configuration of a battery pack 202 according to one of the embodiments of the present disclosure. As illustrated in FIG. 7, the battery pack 202 includes a temperature sensor 71 provided in the second exhaust passage 60. In the battery pack 202 with this configuration, when a high-temperature gas produced in at least one of the cells 100 due to occurrence of a failure flows into the second exhaust passage 60 and increases the temperature inside the second exhaust passage 60, the temperature sensor 71 detects the increase in the temperature inside the second exhaust passage 60, thereby enabling accurate detection of occurrence of the failure in any of the cells 100 housed in the battery pack 202. It is thus possible to quickly take a measure to ensure safety of the apparatus equipped with the battery pack when a failure occurs in any of the cells 100 housed in the battery pack 202.

Although this embodiment exemplifies the specific configuration in which the temperature sensor 71 is provided in the second exhaust passage 60, the present disclosure is not limited to this configuration. For example, a configuration in which a gas sensor is provided in the second exhaust passage 60 may also be adopted into the present disclosure. In addition, a configuration in which a gas sensor or a temperature sensor is provided in the first exhaust passage 50 may also be adopted.

Figure 8:
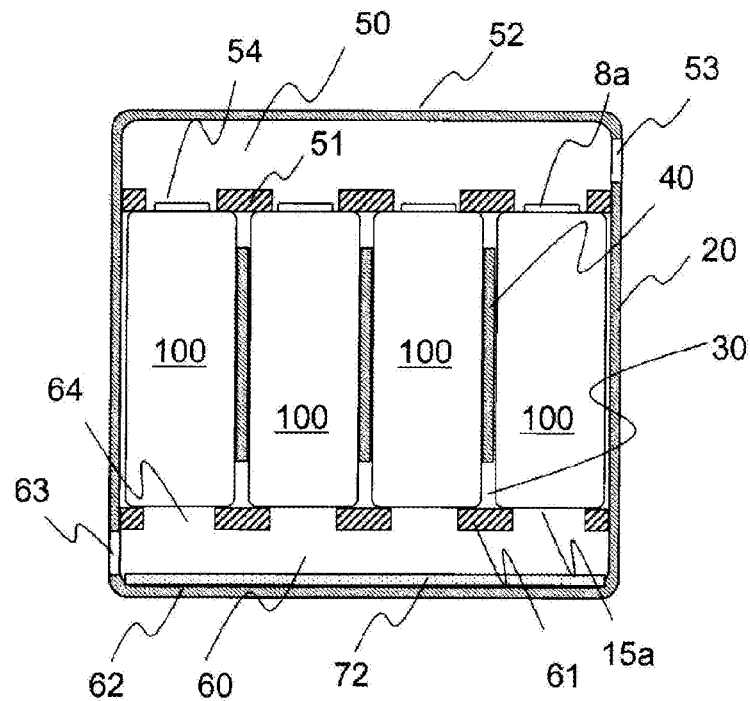
FIG. 8 is a cross-sectional view illustrating a configuration of a battery pack according to another embodiment of the present disclosure.

FIG. 8 is a cross-sectional view illustrating a configuration of a battery pack 203 according one of the embodiments of the present disclosure. As illustrated in FIG. 8, in the battery pack 203, part of the second outer plate 62 forming the second exhaust passage 60 is made of a heat-resistant material 72. In the battery pack 203 with this configuration, when a high-temperature gas produced in at least one of the cells 100 due to occurrence of a failure flows into the second exhaust passage 60 and comes into contact with the members forming the second exhaust passage 60 such as the second outer plate 62, it is possible to prevent portions in contact with the high-temperature gas from being deformed or damaged by the heat of the high-temperature gas. Thus, the second exhaust passage 60 will have no deformed or damaged portions through which the high-temperature gas might flow outside the battery pack or into the housing 30, or into the first exhaust passage 50 via the housing 30. Consequently, it is possible to effectively prevent the high-temperature gas from flowing into the first exhaust passage 50 through the housing 30 and from coming into contact with the cells 100 in the housing 30 and the electrolyte and the flammable gas in the first exhaust passage 50. A material capable of maintaining its physical properties even when exposed to the heat of the high-temperature gas is sufficiently employed as the heat-resistant material of the present disclosure. Examples of the heat-resistant material include metal materials such as iron and aluminum and heat-resistant resins such as a glass epoxy resin, polyphenylene sulfide, and polyarylate.

Although this embodiment exemplifies the specific configuration in which part of the outer plate 62 forming the second exhaust passage 60 is made of the heat-resistant member 72, the present disclosure is not limited to this configuration. For example, part of the outer plate 62 forming the second exhaust passage 60 may be made of a flame-retarding material. If this is the case, when a high-temperature gas produced in at least one of the cells 100 due to occurrence of a failure flows in the second exhaust passage 60, it is possible to prevent deformation and damage caused by combustion of portions of the outer plate 62 and other members forming the second exhaust passage 60 which have come into contact with the high-temperature gas. A material whose physical properties are not damaged by combustion caused by exposure to the heat of the high-temperature gas may be sufficiently employed as the flame-retarding material of the present disclosure. Examples of the flame-retarding material include ceramic, glass, a plate of flame-retarding fibers, and flame-retarding plywood.

Figure 9:
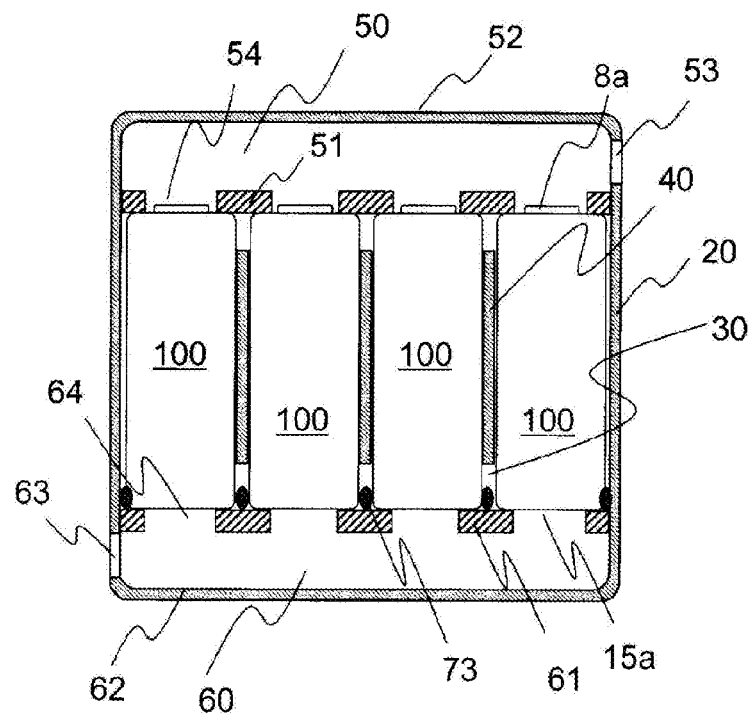
FIG. 9 is a cross-sectional view illustrating a configuration of a battery pack according to another embodiment of the present disclosure.

FIG. 9 is a cross-sectional view illustrating a configuration of a battery pack 204 according to one of the embodiments of the present disclosure. As illustrated in FIG. 9, the battery pack 204 includes packing 73 provided at gaps between the cells 100 and the second partitioning wall 61 such that the airtightness of the second exhaust passage 60 becomes higher than that of the first exhaust passage 50. In the battery pack 204 with this configuration, even when a high-temperature gas produced in at least one of the cells 100 due to occurrence of a failure flows into the second exhaust passage 60 and increases the pressure in the second exhaust passage 60, it is possible to prevent the high-temperature gas from entering the housing 30 through the gaps between the cells 100 and the second partitioning wall 61. It is accordingly possible to effectively prevent the high-temperature gas from flowing into the housing 30 and into the first exhaust passage 50 via the housing 30, and from coming into contact with the electrolyte and the flammable gas in the first exhaust passage 50.

Figure 10:
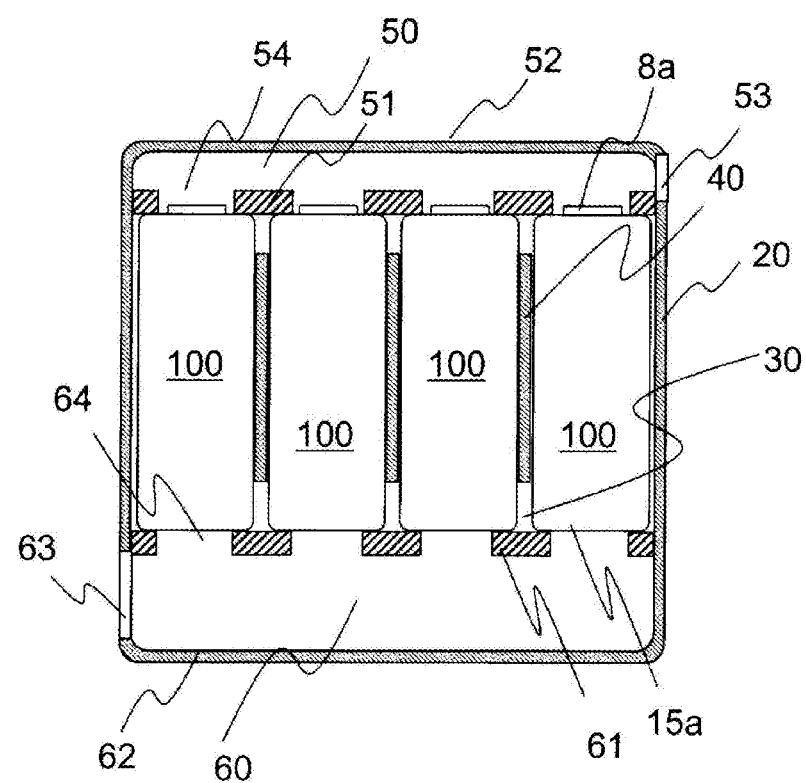
FIG. 10 is a cross-sectional view illustrating a configuration of a battery pack according to another embodiment of the present disclosure.

FIG. 10 is a cross-sectional view illustrating a configuration of a battery pack 205 according to one of the embodiments of the present disclosure. As illustrated in FIG. 10, in battery pack 205, the second exhaust passage 60 has a larger passage area than the first exhaust passage 50, and a pressure loss of the second exhaust passage 60 is smaller than that of the first exhaust passage 50. In the battery pack 205 with this configuration, when a high-temperature gas produced in at least one of the cells 100 due to occurrence of a failure flows into the second exhaust passage 60, it is possible to control a pressure increase caused by the high-temperature gas in the second exhaust passage 60. Accordingly, it is possible to prevent the members forming the second exhaust passage 60 such as the second partitioning wall 61 and the second outer plate 62 from suffering deformation or damage which could be caused by the pressure increase in the second exhaust passage 60. Since the second exhaust passage 60 does not suffer the deformation or damage which could allow the high-temperature gas to flow to the outside of the battery pack or into the housing 30 and further into the first exhaust passage 50 via the housing 30, it is possible to effectively prevent the high-temperature gas from coming into contact with the cells 100 in the housing 30 and the electrolyte and the flammable gas in the first exhaust passage 50.

The forgoing embodiments have been described as example techniques of the present disclosure, and the present disclosure is not limited to the embodiments. For example, each of the connection passages connecting the safety valves of the cells to the corresponding exhaust passage may be made of a hollow member connected to the cell, or may be formed by extending part of a member of the cell such as the cell case. The positional relation between the first and second exhaust ports may be changed as long as the gas released from one port is unlikely to be mixed with the gas released from the other port. For example, one port may be located inside the apparatus equipped with the battery pack and the other port may be located outside the apparatus. The cells housed in the pack case may be arranged not only in a straight line, but also in a zigzag manner, in a curved line, or in a line having a bend. The number of the cells per a battery pack must be two or more, but is not limited to a specific number. The structure of the body of the battery pack is not particularly limited.

INDUSTRIAL APPLICABILITY

The battery packs of the present disclosure are suitably used as power sources for portable electronic devices such as personal computers and cellular phones, hybrid electric vehicles, power tools, etc.

DESCRIPTION OF REFERENCE CHARACTERS

1 Positive electrode
2 Negative electrode
3 Separator
4 Electrode group
7 Cell case
8 Terminal plate
8a Gas release vent
11 Gasket
12 Filter
12a Filter hole
13 Inner cap
13a Opening
14 Gas release valve
14a Thin wall portion
15a Engraved thin wall portion
20 Pack case
30 Housing
40 Spacer
50 First exhaust passage
51 First partitioning wall
52 First outer plate
53 First exhaust port
54 First connection passage
60 Second exhaust passage
61 Second partitioning wall
62 Second outer plate
63 Second exhaust port
64 Second connection passage
70 Gas absorber
71 Temperature sensor
72 Heat-resistant member
73 Packing
100, 101, 102 Cell
200, 201, 202, 203, 204, 205 Battery pack

The invention claimed is:

1. A battery pack comprising a plurality of cells, wherein the plurality of cells are arranged such that the cells are oriented in a same direction,
the cells each have a first safety valve and a second safety valve whose operating pressure is higher than an operating pressure of the first safety valve,
the first safety valve of each cell is connected to a first exhaust passage,
the second safety valve of each cell is connected to a second exhaust passage, and
the first exhaust passage is spatially separated from the second exhaust passage such that fluid within the first exhaust passage is isolated from fluid within the second exhaust passage.

2. The battery pack of claim 1, wherein
an amount of a gas released per unit time from each first safety valve in operation is smaller than an amount of a gas released per unit time from each second safety valve in operation.

3. The battery pack of claim 1, wherein
an opening area of each first safety valve in operation is smaller than an opening area of each second safety valve in operation.

4. The battery pack of claim 3, wherein
the opening area of each first safety valve in operation is smaller than or equal to one-tenth the opening area of each second safety valve in operation.

5. The battery pack of claim 3, wherein
the opening area of each first safety valve in operation is smaller than or equal to one-twentieth the opening area of each second safety valve in operation.

6. The battery pack of claim 1, wherein
each first safety valve is configured to become blocked at least when the corresponding second safety valve operates.

7. The battery pack of claim 1, wherein
the plurality of cells are housed in a case,
the first safety valves are provided at ends of the cells,
the second safety valves are provided at the other ends of the cells, and
a first partitioning wall provided on the ends of the cells and a second partition wall provided on the other ends of the cells partition the case into the first exhaust passage, a housing configured to house the cells, and the second exhaust passage.

8. The battery pack of claim 1, wherein
at least one of a gas absorber, a fire-extinguishing agent, or a coolant is provided in the first exhaust passage or the second exhaust passage.

9. The battery pack of claim 1, wherein
at least one of a temperature sensor or a gas sensor is provided in the first exhaust passage or the second exhaust passage.

10. The battery pack of claim 1, wherein
at least part of the second exhaust passage is made of a heat-resistant material or a flame-retarding material.

11. The battery pack of claim 1, wherein
airtightness of the second exhaust passage is higher than that of the first exhaust passage.

12. The battery pack of claim 1, wherein
the first exhaust passage has a first exhaust port through which a gas released from at least one of the first safety valves is exhausted to outside,
the second exhaust passage has a second exhaust port through which a gas released from at least one of the second safety valves is exhausted to the outside, and
a pressure loss of the gas passing through the second exhaust passage is smaller than a pressure loss of the gas passing through the first exhaust passage.

* * * * *